(No Model.)
A. R. KETCHAM.
STOP COCK BOX FOR WATER AND GAS PIPES.
No. 332,401. Patented Dec. 15, 1885.
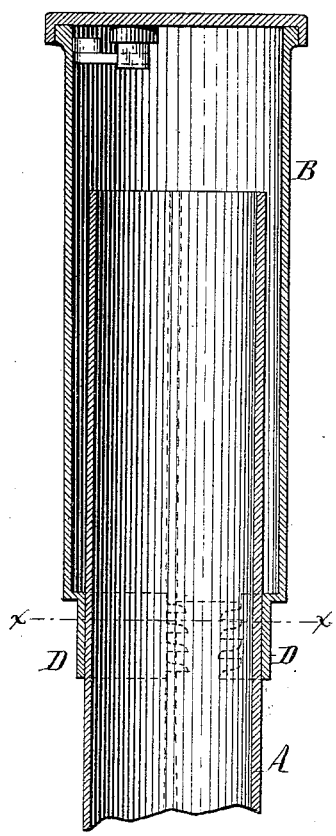
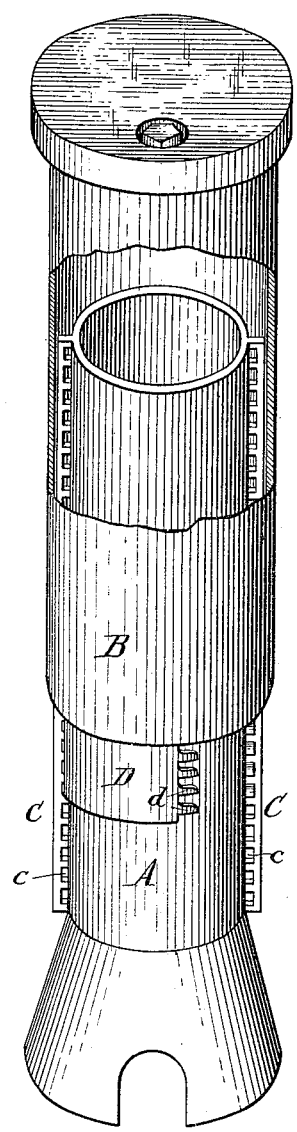
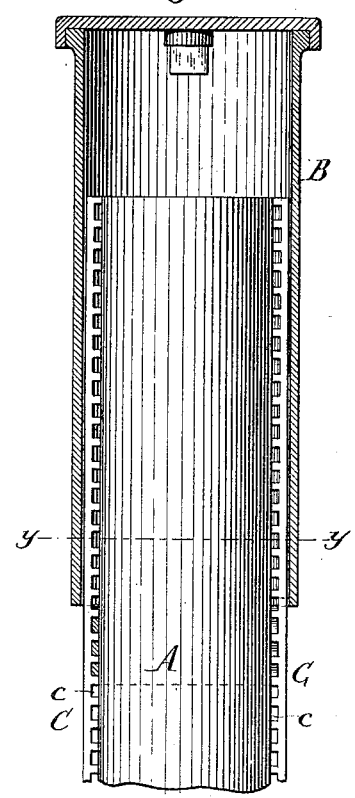
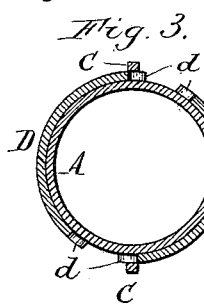
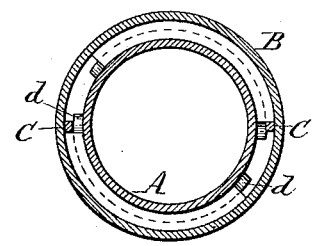
Witnesses: Theo. L. Popp. Geo. E. Pitman.
A. R. Ketcham, Inventor.
By Wilhelm & Bonner, Attorneys.

UNITED STATES PATENT OFFICE.

ALONZO R. KETCHAM, OF BUFFALO, NEW YORK.

STOP-COCK BOX FOR WATER AND GAS PIPES.

SPECIFICATION forming part of Letters Patent No. 332,401, dated December 15, 1885.

Application filed May 12, 1885. Serial No. 165,284. (No model.)

*To all whom it may concern:*

Be it known that I, ALONZO R. KETCHAM, of the city of Buffalo, in the county of Erie and State of New York, have invented new and useful Improvements in Stop-Cock Boxes for Water and Gas Pipes, of which the following is a specification.

This invention relates to an improvement in that class of extensible tubular boxes or casings which are employed in connection with the street-cocks of water and gas pipes, and which consist of two concentric telescopic tubes connected together by a locking device which permits the tubes to be separated by turning one tube upon the other, leaving the two tubes free for lengthening or shortening the box by sliding one tube lengthwise upon the other, while by a similar turning movement the two tubes are locked together after having been adjusted.

The object of this invention is to provide the tubes with a simple and reliable locking device which permits the tubes to be readily secured together or to be disconnected; and my invention consists to that end of the improvements which will be hereinafter fully set forth, and pointed out in the claims.

In the accompanying drawings, Figures 1 and 2 are vertical sections of my improved stop-cock box at right angles to each other, showing the two tubes interlocked. Fig. 3 is a cross-section in line $x$ $x$, Fig. 1. Fig. 4 is a cross-section in line $y$ $y$, Fig. 2. Fig. 5 is a perspective view of the box with a portion of the outer tube broken away.

Like letters of reference refer to like parts in the several figures.

A represents the inner and lower tubular part of the box, and B the upper and outer tubular part thereof, which is fitted loosely on the part A, so that the part B can be easily raised and lowered on the part A.

C represents two vertical ribs formed on the outer surface of the inner tube, A, on diametrically-opposite sides thereof, and provided each with a series of openings, $c$. The outer tube, B, is made so much larger in diameter than the inner tube, A, that it clears the ribs C, so that the outer tube, B, can be freely turned, and raised and lowered on the inner tube, A, even when the adjacent surfaces of the tubes have become corroded after long use.

D D represent segmental extensions formed on the lower end of the outer tube, B, on diametrically-opposite sides thereof, and bearing snugly against the inner tube, A.

$d$ represents teeth formed on the vertical edges of the segments D, and adapted to enter the openings $c$ in the ribs C, thereby locking the tubes A and B together. The spaces between the toothed vertical edges of the segments D are sufficiently large to permit both segments to be wholly disconnected from the ribs C.

Upon turning the outer tube, B, on the tube A, so as to disengage the teeth $d$ of the segments D from the openings $c$ of the ribs C, the outer tube, B, can be freely raised or lowered on the inner tube, A, as may be necessary to lengthen or shorten the box. When the desired adjustment has been made, the tubes are firmly secured together by a simple turning movement of the outer tube, B, on the inner tube, A, whereby the teeth $d$ are caused to enter the openings $c$ of the ribs C. The ends of the teeth are preferably inclined or beveled, to facilitate their engagement in the openings $c$ of the ribs. The outer tube, B, bears only with the segments D against the inner tube A, while the bodies of the tubes are not in contact with each other, whereby the turning and sliding movements of one tube on the other are readily effected, even when the tubes are corroded or encumbered with earth. Each tube is readily cast complete with its attachments.

I claim as my invention—

1. The combination, with the inner tube, A, provided with vertical ribs C, having openings $c$, of the outer tube, B, provided with segments D, having teeth $d$, substantially as set forth.

2. The combination, with the inner tube, A, provided with vertical ribs C, having openings $c$, of the outer enlarged tube, B, which clears the ribs C and tube A, and which is provided with segments D, bearing against the tube A, and having teeth $d$, substantially as set forth.

Witness my hand this 16th day of April, 1885.

A. R. KETCHAM.

Witnesses:
JNO. J. BONNER,
CHAS. F. GEYER.